United States Patent Office 3,006,454
Patented Oct. 31, 1961

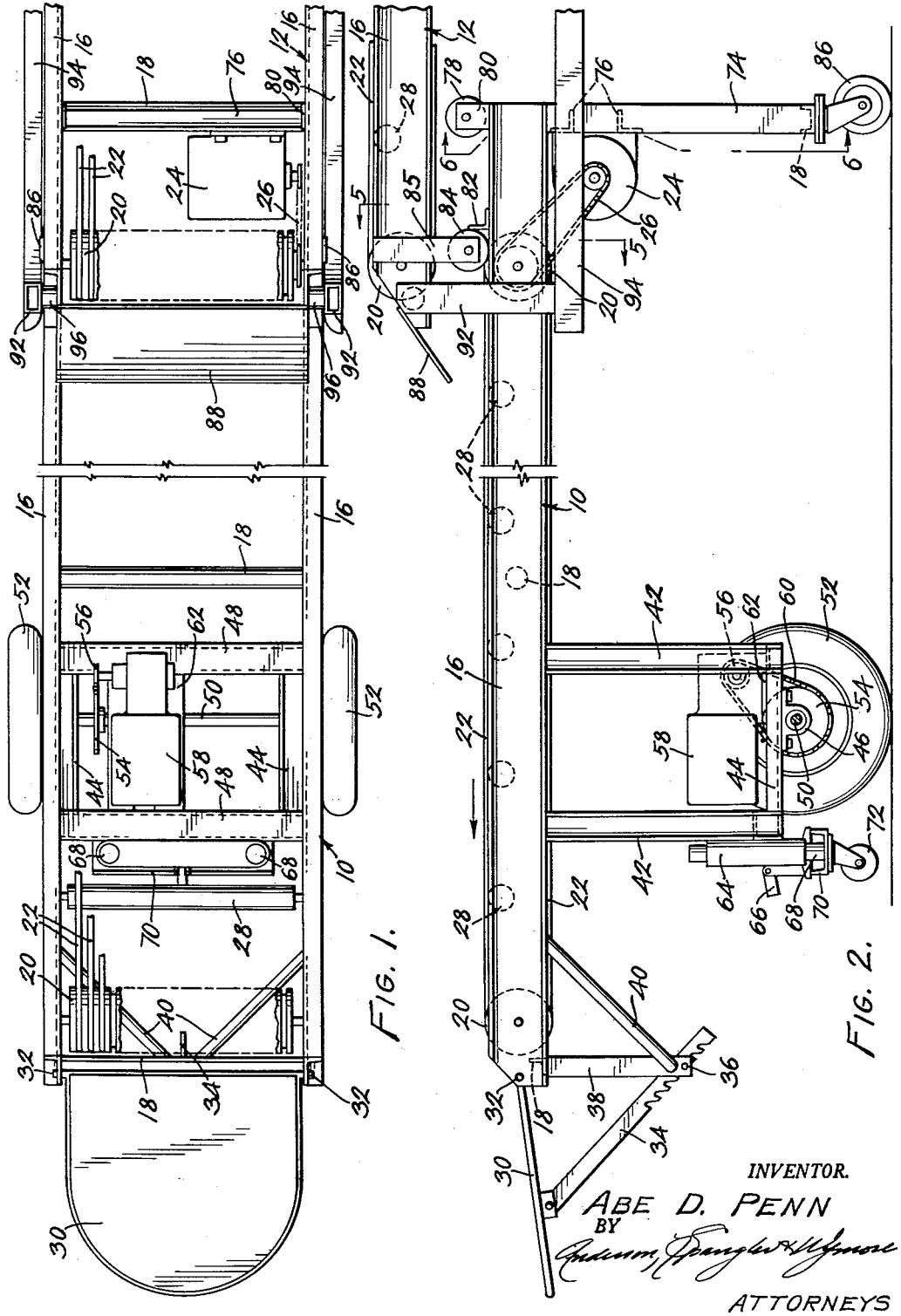

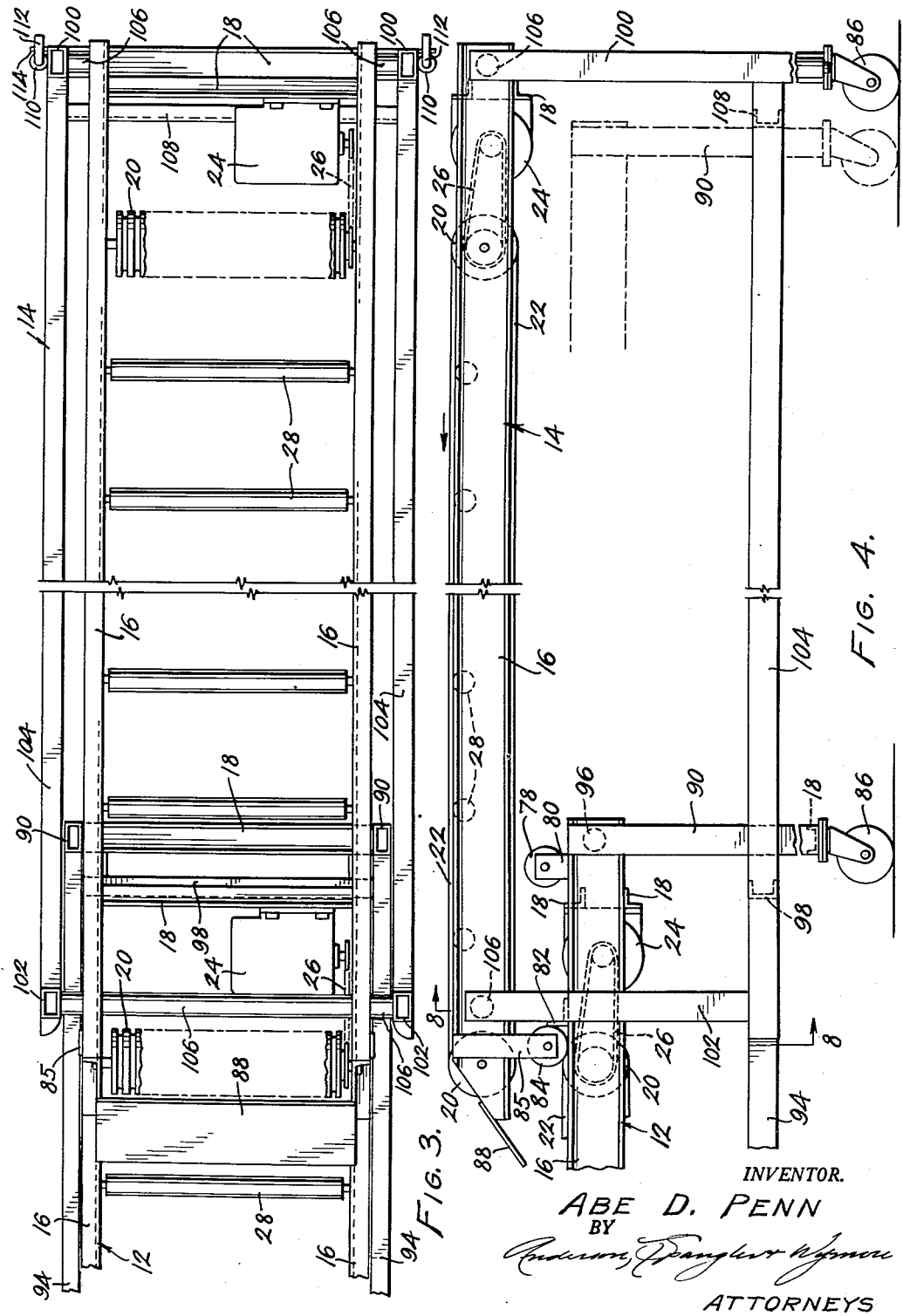

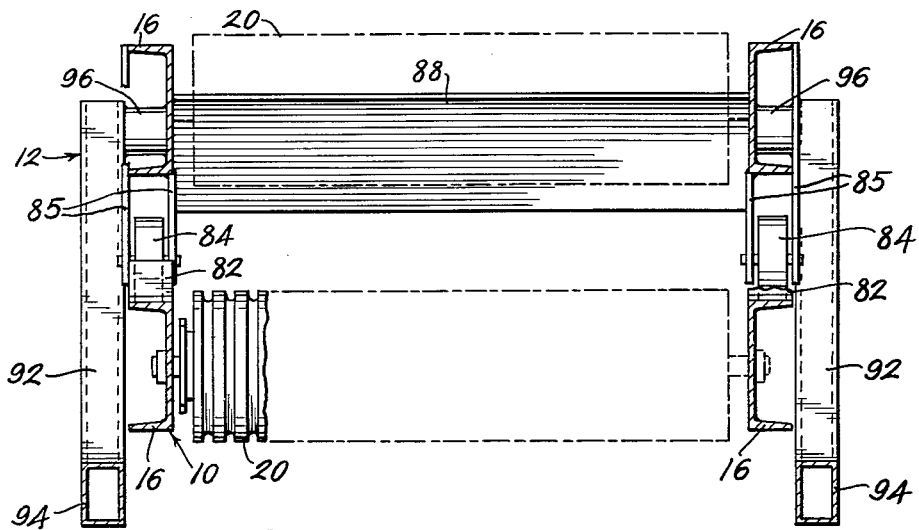
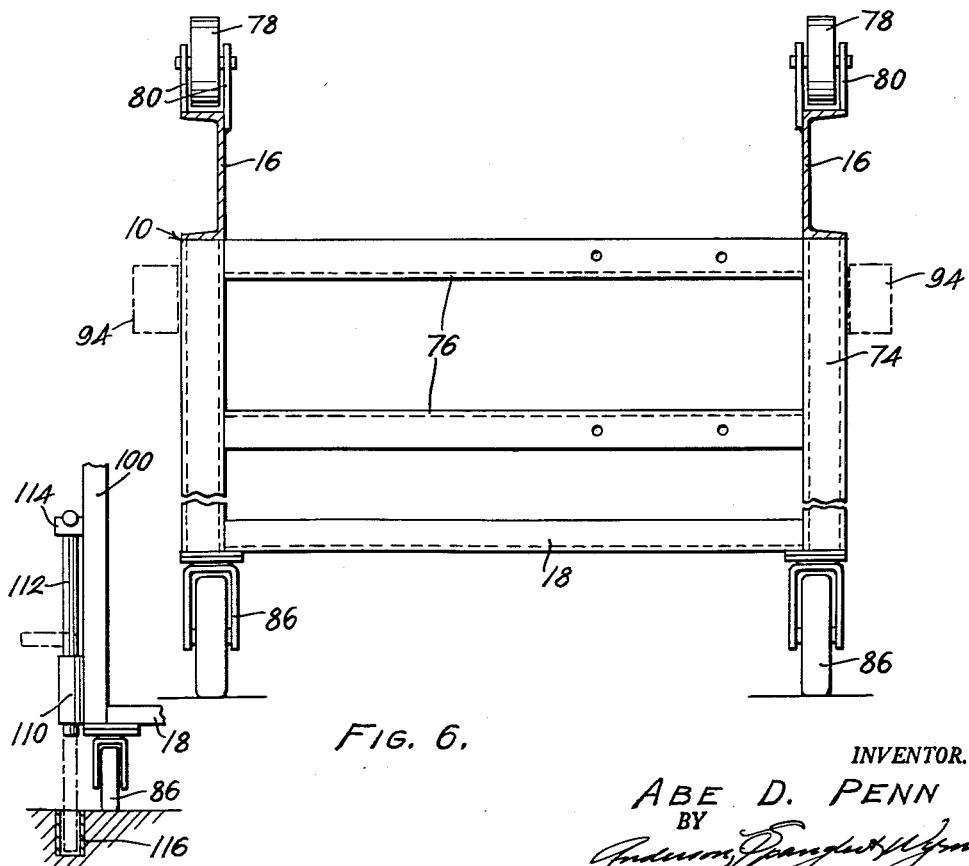

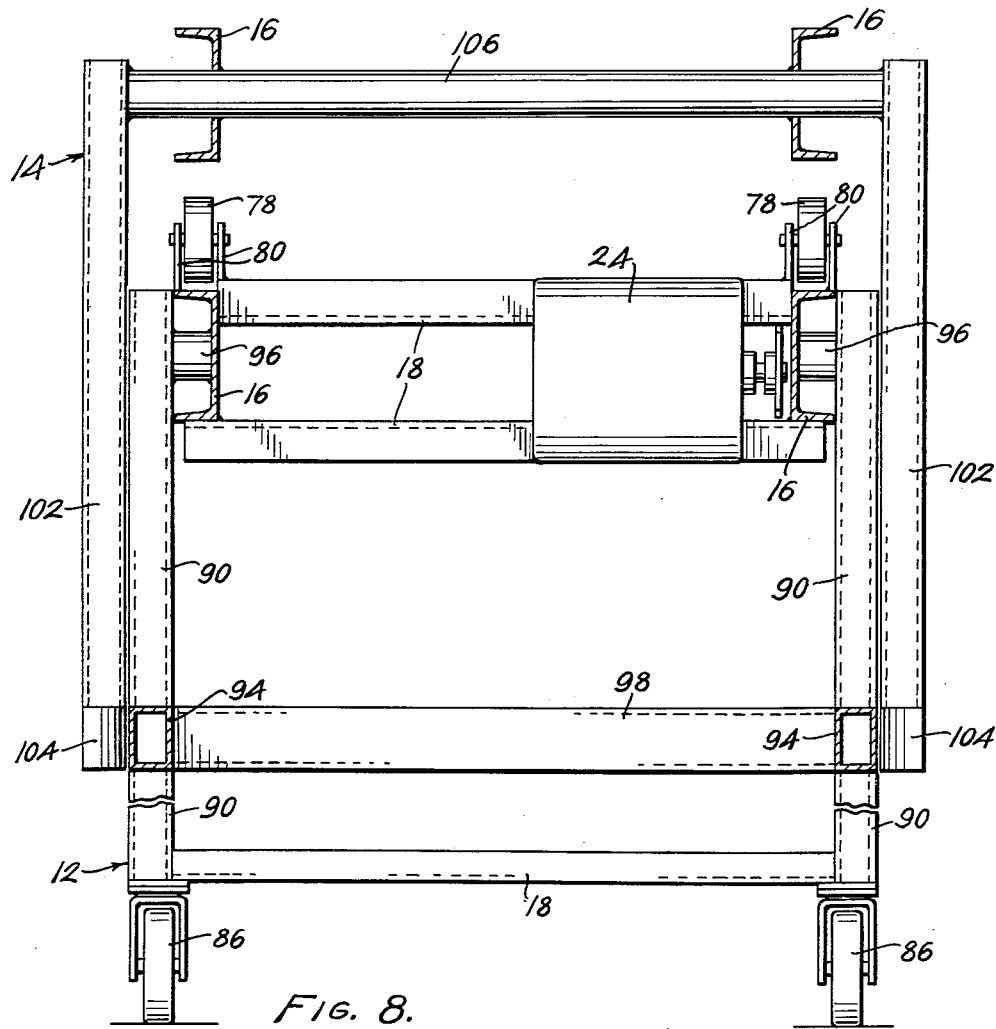
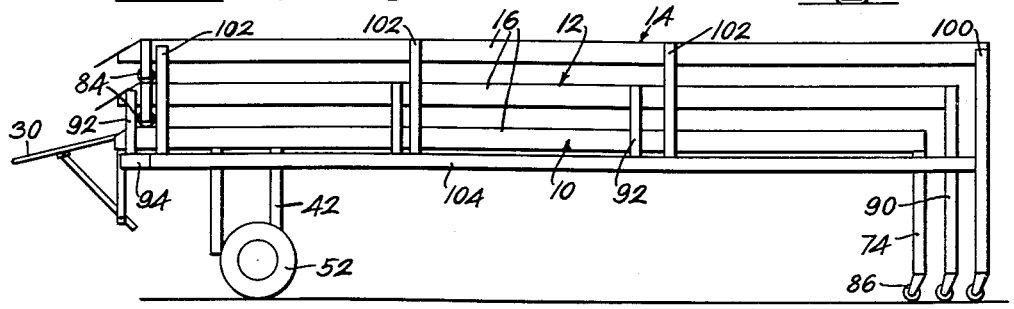

3,006,454
TELESCOPING CONVEYOR ASSEMBLY
Abe D. Penn, 140 S. Eudora St., Denver, Colo.
Filed Dec. 19, 1958, Ser. No. 781,739
2 Claims. (Cl. 198—89)

This invention relates to belt-driven conveyors and, more specifically, to telescoping conveyors of the spring-belt-driven type.

Up-to-date manufacturing, packaging and material-handling operations require the use of versatile, multi-purpose equipment capable of performing a variety of functions. In many instances, this equipment is designed so that it can be moved from one production line to another or stored with a minimum of time and effort. Also, such equipment preferably operates equally well with materials of several different sizes, shapes, weights and compositions. Obviously, these factors can result in a considerable saving in the capital investment required to equip a plant, enable the same operations to be performed in much less space than would be required if single-purpose fixed installations were used, and cause substantial savings in labor costs due to more efficient utilization of the available manpower.

The aforementioned factors become especially important in connection with material-handling equipment, and particularly with conveyors. Most conveyors are of the fixed type which are more or less permanently attached to the floor or other supporting structure and are seldom moved except, perhaps, for replacements or repair. Generally speaking, these units are designed and arranged for a specific material-handling problem and, therefore, are of little or no value for any other purpose. Also, they occupy a considerable amount of floor space and may severely limit the operations that can be carried out in their immediate vicinity.

Certain other conveyors are considered movable from place-to-place primarily because they are not permanently attached to any support; however, as a practical matter, such movement becomes exceedingly difficult and oftentimes requires that considerable disassembly and reassembly take place. These units are seldom movable under their own power which, of course, necessitates that they be taken from one place to another by hand or with some type of vehicle. In any event, such a conveyor is not considered sufficiently mobile to enable it to be moved at will to another location where a conveying operation is to take place.

Some conveyors are, of course, easily moved from one position to another by reason of their being mounted on a wheeled carriage. Most of them, however, include no drive mechanism operative to move the unit from place-to-place under its own power nor do many of them have power-driven conveyor belts or the like because they become too heavy to be moved by hand. Thus, most wheel-supported conveyors are of the short gravity-operated type which can be pushed around by hand.

A second factor of equal, if not greater, significance than that of mobility in the design of a multi-purpose conveyor is that of variable length. It is a rare circumstance indeed to find that a conveyor of the same fixed length will perform two different conveying operations, much less several. Most, if not all, of the conveyors that include a structure whereby they may be made shorter or longer, do so by the addition or subtraction of one or more fixed length sections. This, of course, is a time-consuming and troublesome operation and seldom results in an assembly of the desired length due to the fact that the adjustments are limited to the length of one of the sections. As a result, these adjustments in length are seldom made unless the new operation is to be a more or less permanent one.

One other factor is worthy of mention in addition to those of mobility and adjustability, namely, that of compactness. A conveyor can be designed to provide both of the features already discussed; yet, have little versatility by reason of the fact that it is so long and unwieldy that it cannot be moved or stored unless it is disassembled. For example, a conveyor unit which is forty feet or more in length can be extremely difficult to move due to the lack of sufficient unobstructed space, especially if it has to be turned around one or more corners.

It is, therefore, the principal object of the present invention to provide a telescoping spring-belt-driven conveyor.

A second object is the provision of a conveyor that is mounted on a wheel-supported carriage that includes its own drive mechanism operative to move the unit from place-to-place.

Another object of the invention is to provide a conveyor of the class described which can be adjusted to any desired length within wide limits.

Still another objective is the provision of a spring-belt-driven conveyor that has two or more telescoping sections which may be retracted one under the other to provide an extremely compact unit capable of being moved from place-to place under its own power.

An additional object of the instant invention is to provide a conveyor that can be retracted into a compact assembly, shifted to a new location and extended to any desired length under its own power and without any disassembly.

Further objects of the present invention are to provide a telescoping conveyor that is versatile, relatively lightweight, easy to operate and service, and one that is capable of handling a wide variety of both packaged and unpackaged materials of varying sizes, shapes and weights.

Other objects will be in part apparent and in part pointed out specifically hereinafter in connection with the description of the drawings that follow, and in which:

FIGURE 1 is a fragmentary top plan view showing the front section and the front end of the intermediate section of the telescoping conveyor of the present invention, portions of the front section having been broken away to conserve space;

FIGURE 2 is a fragmentary side elevation similar to FIGURE 1 showing the front section and front end of the intermediate section with portions of the front section broken away;

FIGURE 3 is a fragmentary top plan view similar to FIGURE 1 and essentially a continuation thereof showing the rear end of the intermediate section and rear section with portions of the rear section broken away to conserve space;

FIGURE 4 is a fragmentary side elevation similar to

FIGURE 2 and forming a continuation thereof which shows the rear end of the intermediate section and the rear section with a portion thereof broken away;

FIGURE 5 is a section to an enlarged scale taken along line 5—5 of FIGURE 2, portions thereof having been broken away to better show the construction;

FIGURE 6 is a section to an enlarged scale taken along line 6—6 of FIGURE 2, portions having been broken away to conserve space;

FIGURE 7 is a fragmentary detail showing the manner in which the latch carried by the rear section is used to anchor the assembly to the floor;

FIGURE 8 is an enlarged section taken along line 8—8 of FIGURE 4, portions of which have been broken away to conserve space; and, FIGURE 9 is a side elevation to a reduced scale showing the three sections of the conveyor telescoped one under the other into fully retracted position.

Referring now to the drawing and specifically to FIGURES 1–4, inclusive, thereof, it will be seen that the conveyor of the present invention comprises basically two or more wheel-supported sections interconnected for relative telescoping movement between an extended and a retracted position. In the particular form illustrated in the drawings, the conveyor includes a front section, an intermediate section and a rear section which have been designated broadly by numerals 10, 12 and 14, respectively.

Front section 10, as best seen in FIGURES 1 and 2, comprises a pair of elongated channels 16 arranged in transversely spaced substantially parallel relation and interconnected by a plurality of transverse spacer elements 18. Grooved rollers 20 are journalled for rotation in parallel relation between the channels at longitudinally spaced points throughout the length thereof. Each of these rollers is operatively connected to at least one, and usually two, of the other grooved rollers by means of a plurality of endless spring belts 22. At least one of the grooved rollers in each conveyor section is a drive roller operatively connected to a motor 24 by means of a chain 26 or some other power transmission device. In the preferred conveyor construction, one or more idler rollers 28 are journalled for rotation between the channels and in spaced substantially parallel relation between each pair of adjacent grooved rollers in position to support the endless spring belts and the materials conveyed thereon.

The front or discharge end of conveyor section 10 is provided with a pan 30 having ears 32 depending from the rear corners thereof that are mounted in suitable openings in the channels 16 in a manner to permit the pan to be raised and lowered. A notched brace 34 is pivotally attached to the underside of the pan and provides both a releasable and adjustable connection with pin 36 carried between a pair of frame elements 38 that extend downwardly from spacer 18 located at the front end of section 10. Struts 40 extend between the channels and elements 38 to provide additional support therefor. Thus, by selectively positioning pin 36 in one of the notches in brace 34, the slope of pan 30 can be adjusted.

Now, it will be seen that the entire spring-belt conveyor assembly of the front section 10 just described is supported upon a wheeled carriage that depends from channels 16. This carriage will be seen to include a pair of elements 42 that extend downwardly from each channel 16 near the front end thereof in spaced substantially parallel relation to one another. The front and rear frame elements 42 of each pair are interconnected at their lower ends by a longitudinal element 44 that carries a shaft bearing assembly 46 on the underside thereof intermediate the ends. In addition, the front elements and rear elements of the two pairs 46 are preferably interconnected by transverse elements 48. A shaft 50 is journalled for rotation within the shaft bearings 46 and is provided with tired-wheels 52 attached to opposite ends thereof for conjoint rotation therewith. A sprocket gear 54 is mounted on shaft 50 intermediate the ends thereof and is operatively connected to a second sprocket 56 carried by reversible gear motor 58 by means of sprocket chain 60. Motor 58 is carried by motor mount 62 attached between transverse elements 48 of the carriage. Thus, means are provided for moving the conveyor either forwardly or rearwardly under its own power. It will become apparent as the description proceeds that drive wheels 52 are operative to retract or extend the conveyor, adjust the length thereof and move it from one location to another.

Note, however, that wheels 52 are not steerable and provide no means by which the front end of the conveyor could be swung from side-to-side. Therefore, a retractable caster assembly is also provided on the carriage which is used to perform this important function. This caster assembly comprises a hydraulic jack unit 64 attached to one of the transverse elements 48 of the carriage and operable from a pump connection 66. Spaced guides 68 are interconnected by a cross-frame element 70 attached to the jack and to which are attached casters 72 for swinging movement about substantially vertical pivot axes. As the jack is operated to lower the guides, the casters engage the floor and raise the front end of sections 10 including wheels 52. This, of course, enables the front end of the frame to be swung from side-to-side.

In order to complete the description of the front conveyor section 10, reference will now be had to FIGURES 1, 2 and 6 where it will be seen that the carriage for the conveyor assembly also includes a pair of transversely spaced upright frame elements 74 attached to the rear ends of channels 16. A transverse element 18 interconnects the lower ends of the uprights 74 while a pair of motor-mounting frame elements 76 interconnect the upper portions thereof. Motor 24 which drives the spring-belt conveyor assembly is attached between elements 76 in position to be operatively connected to the drive roller of the front section. It can also be seen that a roller 78 is journalled for rotation between a pair of sideplates 80 mounted in spaced relation on each of the channels 16 at the rear end thereof. These rollers engage the underside of the channels 16 that form the sides of the conveyor assembly of the intermediate conveyor section 12 should the front section tilt downwardly relative thereto in passing over an uneven surface. Also, a transverse stop 82 (FIGURES 2 and 5) is connected across the top of channels 16 of the front section between rollers 78 and the rearmost grooved roller 20 in position to engage roller 84 mounted on the front end of the intermediate section and limit the amount of relative extendable movement therebetween. Finally, casters 86 are attached to the lower ends of uprights 74 for swinging movement about vertical axes so that the rear end of the entire conveyor can be guided with the sections in the retracted position illustrated in FIGURE 9.

Again with reference to FIGURES 1–4, inclusive, intermediate conveyor section 12 will also be seen to include a spring-belt-driven conveyor assembly having spaced longitudinal channels 16 interconnected by transverse elements 18 which form a frame within which grooved rollers 20 and idler rollers 28 are journalled for rotation. Endless spring belts 22 operatively interconnect the grooved rollers as before, and one of the rollers is a driver connected by means 26 to a second reversible gear motor 24 mounted on transverse elements 18 at the front end of the intermediate section 12. Thus, the intermediate section is provided with a complete, but independent spring-belt-driven conveyor assembly similar in all material respects to the one found on the front section which has already been described in detail.

Considering the aforementioned figures of the drawing, and in addition, FIGURES 5 and 8, it will be seen that the channels 16 of the intermediate section overlie the corresponding channels 16 of the front section. Rollers 84 at the front end of the intermediate section are mounted for rotation between spaced sideplates 85 attached on opposite sides of each channel 16 of the intermediate frame in position to roll along the upper flange of channels 16 of the front section which form rails therefor. Thus, the front end of the intermediate section 12 is supported on the front section 10 and is prevented by transverse stop 82 from becoming detached therefrom by rolling off the rear end. Also note that the rigid inclined pan is attached to the front end of the intermediate section 12 between channels 16 thereof which are cut on the bias.

The rear end of intermediate section 12 is supported for rolling movement along the ground by a wheeled carriage that includes a pair of upright elements 90 having casters 86 attached to the lower ends thereof for swinging movement about vertical axes. A pair of downwardly extending elements 92 depend from the front end of the intermediate section in longitudinal alignment with elements 90 to which they are connected by a pair of siderails 94. Elements 90 and 92 are mounted on the outside of channels 16 of the intermediate section 12 by means of spacers 96 that locate the siderails 94 on the outside of uprights 74 mounted on the rear end of the front section 10. Thus, rails 94 function to align and guide the front section 10 as it telescopes beneath the intermediate section 12 moving relative thereto between its extended and retracted positions while maintaining elements 84 in rolling engagement with the upper flange of channels 16 of the front section. A transverse stop 98 interconnecting the siderails 94 ahead of uprights 90 engages upright elements 74 of the front section and limits the rearward movement thereof relative to the intermediate section.

Transverse elements 18 interconnect the upright elements 90 at the top and bottom maintaining the fixed spaced relation therebetween. Stop element 82 is also provided near the rear end of the intermediate section in position to engage the rollers 84 that are mounted for rotation between sideplates 85 that depend from the front end of the rear section 14. The rear end of the intermediate section 12, as was the case with front section 10, is also provided with a pair of the roller and sideplate assemblies 78 and 80 positioned to engage the lower flange of channels 16 on the rear section 14 in the event that these two sections tilt relative to one another.

Now, the rear section 14 can best be described in connection with FIGURES 3, 4, 5 and 8 of the drawings wherein it will be seen that it is of basically the same construction as intermediate section 12. The conveyor assembly of the rear section need not be set forth in detail except to note that it includes channels 16, rollers 20, spring belts 22, motor 24, belt 26, transverse elements 14 and pan 88 arranged in the same relation as in the intermediate section. Also, the front end of the rear section is supported for rolling movement along the upper flange of channels 16 of the intermediate section by means of a pair of roller and sideplate assemblies 84 and 85. Here again, the channels 16 of the rear section 14 are arranged directly above the like elements of the intermediate section 12.

Similarly, the rear section includes a wheeled-carriage having a pair of upright elements 100 at the rear extremity thereof with casters 86 on their lower ends, a pair of downwardly extending elements 102 at the front end and siderails 104 interconnecting elements 102 and 100. Elements 100, 102 and 104 of the rear section correspond to similar elements 90, 92 and 94 respectively, of the intermediate section and perform identical functions. Siderails 104, however, are positioned in side-by-side relation to siderails 94 which, of course, requires that elements 100 and 102 be longer than their counterparts 90 and 92 of the intermediate section. Also, connectors 106 which support and maintain elements 100 and 102 in fixed spaced relation to the channels 16 of the rear section are longer than corresponding elements 96 of the intermediate section in order to position guide rails 104 on the outside of rails 94. Transverse stop 108 of the rear section performs the same function as stop 98 of the intermediate section to limit the extent of retraction of the intermediate section underneath the rear section.

FIGURES 3 and 7 show both of the upright elements 100 of the rear section provided with a latch assembly comprising a vertically disposed tubular element 110 having an L-shaped pin 112 mounted therein for vertical sliding movement between the full-line raised position and the dotted line lowered position. In raised position, the pin is turned and hooked over a retaining element 114 also carried by upright 100. When lowered, pin 112 seats in a socket 116 formed in the supporting surface as shown in FIGURE 7. This latch assembly provides means for holding the conveyor in fixed position.

FIGURE 9 shows in somewhat diagrammatic form the compact retracted position of the conveyor. Note that the casters 86 on the rear end of each section, with the conveyor in retracted position, lie adjacent one another and permit the unit to be steered when moving it backwards. Also, elements 92 and 102 of the intermediate and rear sections may be located at several longitudinally spaced points between the front and rear ends thereof as required for structural stability.

Finally, in FIGURES 2 and 4 it can be seen that the front section 10 can be used independent of the intermediate and rear sections whenever a short mobile conveyor is required by merely lifting the front end of the intermediate section up until roller 84 clears stop 82 and roller 78 of the front section. The same is, of course, true of the front and intermediate sections which can be operated together while disconnected from the rear section in like manner.

Having thus described the several useful and novel features of the telescoping conveyor of the present invention in connection with the accompanying drawing, it will be seen that the many worthwhile objectives for which it was designed have been achieved. Although but a single specific embodiment of the invention has been shown, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. A telescopable conveyor assembly comprising, at least two sections having a carriage and an independent conveyor unit supported thereon, the conveyor units each including a pair of transversely spaced substantially parallel side frame elements having power-driven conveyor means supported therebetween adapted to transport materials from one end to the other, the carriage of each section having upright elements with casters on the lower ends thereof supporting the rear end of the conveyor unit, the carriage of one section including power-driven wheeled means suporting the front end of the conveyor unit and powered by a reversible motor operatively connected thereto and adapted upon actuation to move the assembly from place to place, and further adapted for telescoping the sections and the carriage of a second section including roller means depending from the front end thereof supported for rolling engagement on the sideframe elements of the first-mentioned section to provide for relative longitudinal movement between an extended and a retracted position, wherein the power-driven wheeled means includes a pair of non-steerable drive wheels, vertically-disposed jack means are carried by the power-driven wheeled means operative upon actuation to lift the drive wheels free of the supporting surface, and caster means are mounted on the lower end of the jack means for swinging movement about a substantially vertical axis, said caster means being operative with the drive wheels raised to permit the front end of the conveyor assembly to be swung from side-to-side.

2. The conveyor assembly as set forth in claim 1 in which the carriage of the second section includes a pair of transversely spaced guide rails located outside of the upright elements of the first-mentioned section and adapted to maintain said sections in longitudinal alignment with one another.

References Cited in the file of this patent

UNITED STATES PATENTS

| | | |
|---|---|---|
| 1,224,384 | Kaukaine | May 1, 1917 |
| 2,479,823 | Ernst | Aug. 23, 1949 |
| 2,596,265 | Manierre | May 13, 1952 |
| 2,725,974 | Shields | Dec. 6, 1955 |
| 2,760,617 | Bowen | Aug. 28, 1956 |

FOREIGN PATENTS

| | | |
|---|---|---|
| 300,411 | Germany | Sept. 10, 1917 |
| 522,950 | Great Britain | July 2, 1940 |
| 527,997 | Belgium | Apr. 30, 1954 |
| 626,773 | Germany | Mar. 2, 1936 |